(12) United States Patent (10) Patent No.: US 8,412,203 B2
Ricci et al. (45) Date of Patent: Apr. 2, 2013

(54) NEXT GENERATION CELL PHONE

(75) Inventors: Christopher P Ricci, Dayton, OH (US); Howard L. Speight, Houston, TX (US)

(73) Assignee: Avaya Inc., Basking Ridge, NJ (US)

( * ) Notice: Subject to any disclaimer, the term of this patent is extended or adjusted under 35 U.S.C. 154(b) by 660 days.

(21) Appl. No.: 12/262,650

(22) Filed: Oct. 31, 2008

(65) Prior Publication Data

US 2010/0113034 A1 May 6, 2010

(51) Int. Cl.
 *H04W 36/00* (2009.01)
(52) U.S. Cl. ........ 455/440; 455/442; 455/443; 455/444; 455/41.2; 455/563; 455/525; 455/67.11; 370/328; 370/338
(58) Field of Classification Search .................. None
 See application file for complete search history.

(56) References Cited

U.S. PATENT DOCUMENTS

| | | | |
|---|---|---|---|
| 6,434,366 B1 * | 8/2002 | Harrison et al. ................ 455/69 |
| 7,089,005 B2 | 8/2006 | Reddy |
| 2004/0127241 A1 * | 7/2004 | Shostak ........................ 455/500 |
| 2004/0142657 A1 * | 7/2004 | Maeda .......................... 455/11.1 |
| 2005/0075074 A1 * | 4/2005 | Benson et al. ............. 455/67.11 |
| 2005/0157676 A1 | 7/2005 | Kwak et al. |
| 2006/0009246 A1 | 1/2006 | Marinier et al. |
| 2006/0018393 A1 * | 1/2006 | Gore et al. ..................... 375/260 |
| 2006/0019679 A1 * | 1/2006 | Rappaport et al. ......... 455/456.5 |
| 2007/0121536 A1 * | 5/2007 | Aihara .......................... 370/318 |
| 2007/0140163 A1 | 6/2007 | Meier et al. |
| 2007/0160017 A1 | 7/2007 | Meier et al. |
| 2008/0064404 A1 | 3/2008 | Zhang et al. |
| 2008/0069065 A1 | 3/2008 | Wu et al. |
| 2008/0130604 A1 | 6/2008 | Boyd |
| 2008/0205345 A1 | 8/2008 | Sachs et al. |
| 2008/0299948 A1 * | 12/2008 | Rosener .................... 455/412.2 |
| 2009/0296673 A1 * | 12/2009 | Beach .......................... 370/338 |

OTHER PUBLICATIONS

Perry, Mark et al., "Dealing with Mobility: Understanding access anytime, anywhere", *ACM Transactions on Computer-Human Interaction*, vol. 8, No. 4, (Dec. 2001),323-347.

Bagein, M. et al., "Enabling Speech Based Access to Information Management Systems over Wireless Network", *Proc. of the 3rd workshop on Applications and Services in Wireless Networks (ASWN 2003)*, Berne (Switzerland), (Jul. 2003).

Botond, Pakucs "Butler: A Universal Speech Interface for Mobile Environments", *Lecture Notes in Computer Science 3160 Springer-Verlag*, (Sep. 2004),399-403.

Bardram, Jakob E., et al., "Moving to get aHead: Local Mobility and Collaborative Work", *Proceedings of the Eighth European Conference on Computer Supported Cooperative Work* (Helsinki), (Sep. 2003),355-374.

Krishnan, P. et al., "A System for LEASE: Location Estimation Assisted by Stationary Emitters for Indoor Wireless RF Networks", *Proceedings of IEEE Infocom 2004*, (Mar. 2004).

Harkke, Ville "Physicians' Usage Experiences of a Mobile Information System", *Proceedings of the 38th Hawaii International Conference on System Sciences*, Hawaii, 2005, IEEE.

(Continued)

*Primary Examiner* — Zhiyu Lu
(74) *Attorney, Agent, or Firm* — Sheridan Ross P.C.

(57) ABSTRACT

A system and method are disclosed. The system includes a wireless headset. The wireless headset includes a network receiver to receive beacon signals from wireless access points. A beacon table contains data extracted from the received beacon signals. A wireless network selector selects a wireless access point based on the data in the beacon table. The system further includes a voice agent application coupled to the wireless headset and a special-purpose application coupled to the voice agent application.

18 Claims, 3 Drawing Sheets

OTHER PUBLICATIONS

O'Gorman, Lawrence et al., "Query-Directed Passwords", *Financial Cryptography '04*, Florida, (Feb. 2004).

Brodie, Jacqueline et al., "Designing for "Blue-Collar" Work Mobility, Collaboration and Information Use", *SIGGROUP Bulletin*, vol. 22, No. 3, (Dec. 2001),22-27.

"Avaya one-X Speech Site Preparation Guide", (May 2008).

"Avaya one-X Speech Installation Guide", (May 2008).

Bernsen, Niels O., et al., "Designing Interactive Speech Systems", *Springer-Verlag London Limited*, (1998),127-160.

Gast, Matthew S., "802.11 Wireless Networks", *O'Reilly Media, Inc. (Second Ed.)*, (2005),16-20, 170-187.

Reardon, Marguerite "Switching from cell to Wi-Fi, seamlessly", http://news.zdnet.com/2100-1035_22-149459.html, (Sep. 7, 2006).

Simone, Dan "802.11k makes WLANs measure up", http://www.networkworld.com/news/tech/2004/0329techupdate.html, (Mar. 29, 2004).

Rubin, Jeffrey "Handbook of Usability Testing", *John Wiley & Sons, Inc.*, (1994),25-46, 79-118, 257-293.

\* cited by examiner

NEXT GENERATION CELL PHONE

BACKGROUND

As wireless communications systems become more ubiquitous, consumers, particularly enterprise workers, are becoming more and more mobile. The preferred wireless communication device is a cellular phone. The designers of cellular phones, however, have to balance portability against features and comfort. That is, people desire a device that is small enough to carry in a pocket. While this is easily achieved, the tradeoff is comfort in that people do not like the feel of the small device as they speak into it. Further, these same devices are evolving into mobile computers, filled with data such as large contact databases and an ability to access email and the Internet. As they evolve, there is a need for a keyboard and a large screen, making the goal of a small, portable device difficult to achieve.

As this evolution continues, consumers are turning to wireless headsets to bridge the gap. These headsets generally use Bluetooth wireless protocols to communicate directly with the cellular phone. Bluetooth wireless headsets are becoming commonplace accessories to cellular telephones, particularly outside the United States. Not only can a wireless headset provide mobility, but as a wearable appliance, it can be used hands-free. In this way, the consumer can speak comfortably into a compact device in a hands-free manner. However, if the data that they require is needed, then it is still available in their pocket, briefcase, or otherwise locally.

At the same time, WiMax (which is an abbreviation for Worldwide Interoperability for Microwave Access, based on the IEEE 802.16 standard) and LTE (which is an abbreviation for Long Term Evolution, a project to improve the Universal Mobile Telecommunications System (UMTS) mobile phone standard) are making widespread wireless data access a reality. WiMax, for example, offers faster uploads and downloads than other broadband connections like DSL and cable. It has more reliable connections in areas that tend to have spotty broadband coverage. And the technology ideally promises to wirelessly connect people anywhere across as many as 10 miles, compared with several yards with a Wi-Fi connection (i.e., communication systems covered by the 802.11 family of standards).

SUMMARY

In general, in one aspect, the invention features a system. The system includes a wireless headset. The wireless headset includes an audio circuit to convert a spoken command into a command signal. The wireless headset further includes a network receiver to receive beacon signals from wireless access points and not to otherwise communicate with any wireless access points. The wireless headset further includes a beacon table to contain data extracted from the received beacon signals. The wireless headset further includes a wireless network selector to select a wireless access point based on the data in the beacon table. The wireless headset further includes a wireless network transmitter/receiver to communicate with the selected wireless access point. The wireless network transmitter/receiver is a separate piece of hardware from the network receiver. The system further includes a voice agent application coupled to the wireless headset. The system further includes a special-purpose application coupled to the voice agent application. The voice agent application includes a receiver to receive the command signal from the wireless headset through the selected network. The voice agent application further includes logic to determine that responding to the command signal requires sending a command to the special-purpose application. The voice agent application further includes a transmitter to transmit the command to the special-purpose application.

Implementations of the invention may include one or more of the following. The wireless headset may be coupled to the voice agent application through the selected wireless access point. The system may include a network selector to select between a network accessed by the selected wireless access point and a second network. The wireless headset may be coupled to the voice agent through the network selected by the network selector. The second network may be selected from the group consisting of a cellular network and a Bluetooth network. The system may further include a location application to determine a location of the wireless headset. The location application may provide the location to the wireless network selector to be used in selecting the wireless access point. The system may further include a location application to determine the trajectory of the wireless headset. The location application may provide the trajectory to the wireless network selector to be used in selecting the wireless access point. The special-purpose application may be configured to produce a response upon processing the command. The system may further comprise a text-to-voice application to receive the response, convert the response into an audio signal, and transmit the audio signal to the wireless headset. The audio circuit may convert the audio signal to an audible response. The special-purpose application may be selected from a group consisting of an email application and a database application. The special-purpose application may be selected from a group consisting of a voice-mail application, an email application, a database application, an entertainment application, and a PBX application.

In general, in another aspect, the invention features a system. The system includes a wireless headset. The wireless headset includes an audio circuit to convert a spoken command into a command signal. The wireless headset further includes a network receiver to receive beacon signals from wireless access points and not to otherwise communicate with any wireless access points. The wireless headset further includes a beacon table to contain data extracted from the received beacon signals. The wireless headset further includes a wireless network selector to select a wireless access point based on the data in the beacon table. The wireless headset further includes a wireless network transmitter/receiver to transmit and receive with the selected wireless access point. The wireless network transmitter/receiver is a separate piece of hardware than the network receiver. The system further includes a special-purpose application coupled to the wireless headset. The special-purpose application includes a receiver to receive the command signal from the wireless headset through the selected network. The special-purpose application further includes logic to determine that responding to the command signal requires performing a function of the special-purpose application. The special-purpose application further includes logic to perform the function.

In general, in another embodiment, the invention features a method for managing a telephone call from a device. The method includes building a beacon table containing information received in beacon signals received wirelessly from wireless access points. The method further includes determining that the device is moving in such a way that it will lose an association with an existing wireless access point and that it will not transition to another wireless access point without intervention. The method further includes responding by using information from the beacon table to identify a wireless access point to which to transition the device. The method further includes pre-authenticating the device with the identified wireless access point. The method further includes determining that the device should transition from the existing wireless access point. The method further includes responding by terminating the device's association with the existing wireless access point. The method further includes initiating an association with the identified wireless access point.

Implementations of the invention may include one or more of the following. The method may further include determining that the device should transition to a cellular channel. The method may further include responding by terminating the device's association with any wireless access point. The method may further include initiating a connection between the device and the cellular channel. Determining that the device is moving may include determining the trajectory of the device. Using information from the beacon table to identify a wireless access point to which to transition the device may include analyzing features that would be available to the device via the wireless access point. Using information from the beacon table to identify a wireless access point to which to transition the device may include analyzing the trajectory of the device to determine which wireless access point would cover the device for the longest period of time.

DETAILED DESCRIPTION

A wireless headset communicates using the easiest available system, Wi-Fi if a strong, unsecured connection is available, and WiMax, LTE or the like if not. In the following discussion, the network is simply a means to access a server. Technically, standard cellular phone networks like GSM (which is an abbreviation for Global System for Mobile Communications) could be substituted too.

Further, if multiple networks are available then a geographic location could also be tracked without additional GPS (which is an abbreviation for Global Positioning Satellite System) circuitry. This would allow the system to track presence and location, thereby providing context-aware applications for the consumer and their organizations.

With an audio-only device such as the aforementioned wireless headset, a speech interface is built to manage the system from the user's perspective.

Figure 1:
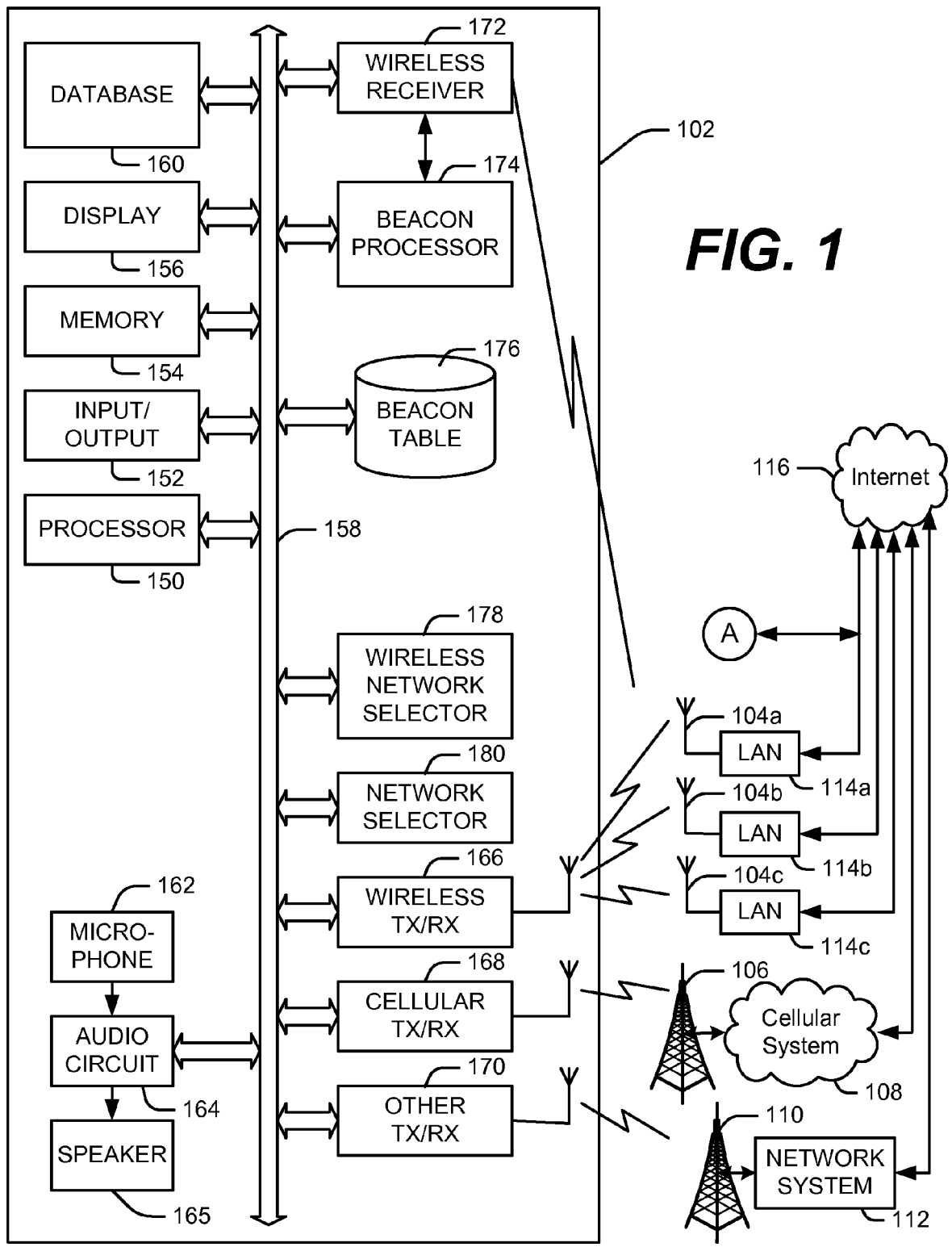
FIG. 1 is a block diagram of a system including a wireless headset.
Figure 3:
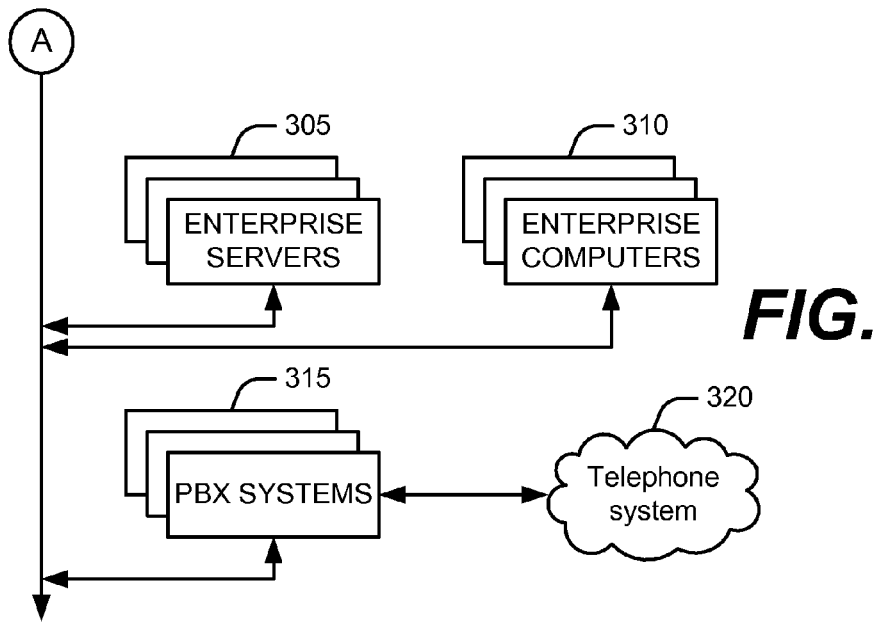
FIG. 3 is a block diagram of hardware elements of a system.

In one embodiment, a system, illustrated in FIG. 1, includes a wireless headset 102 that can selectively communicate with one of a plurality of Wi-Fi wireless access points (WAPs) 104a, 104b, and 104c, a cellular base station 106 communicating with the cellular system 108, a base station or access point 110 for another type of network 112, such as WiMax or LTE. In one embodiment, each of the wireless access points 104a, 104b, and 104c provides access to a local area network (LAN) 114a, 114b, 114c, each of which has a connection to the Internet 116. In one embodiment, the cellular system 108 and the network system 112 also have connections to the Internet 116. The LANs 114a, 114b, 114c may be separate networks or they may be sub-networks within a larger network or within each other. In one embodiment, one of the LANs 114a has a number of components that will be described in greater detail in the discussion of FIGS. 3 and 4. In one embodiment, these components can be accessed by the wireless headset either directly through WAP 104a and LAN 114a or indirectly through one of the other WAPs and LANs or through the cellular system 108 or through the network system 112.

In one embodiment, the cellular system 108 includes the cellular voice channels and/or the cellular signaling system.

While three WAPs are illustrated in FIG. 1, it will be understood that any number of WAPs can be employed.

In one embodiment, the wireless headset 102 is a single physical unit. In one embodiment, the wireless headset is divided into two or more physical subunits. For example, the wireless headset 102 may include an earpiece with a microphone and speaker and the earpiece may communicate with another unit worn, for example, on the user's belt. The connection between the earpiece and the piece worn on the belt may be a wired connection or it may be by Bluetooth or by another radio frequency (RF) or optical communication technique.

In one embodiment, the wireless headset 102 includes a processor 150, input/output devices 152, memory 154, and a display 156 that communicate by one or more busses 158. In one embodiment, the busses 158 include any number of standard busses, including ISA, EISA, PCI, PCI-X, later developed standard busses, and/or a bus or busses developed specifically for the wireless headset 102 or a class of devices that includes the wireless headset 102.

In one embodiment, the input/output 152 includes a keyboard, a trackball, a thumbwheel, and/or any other similar device for typing or selecting. In one embodiment, the input/output 152 includes a wired interface such as USB or Firewire.

In one embodiment, the memory 154 includes volatile and/or non-volatile memory. In one embodiment, the memory 154 includes random access memory (RAM). In one embodiment, the memory includes a disk drive or an optical drive. In one embodiment, the memory includes another type of serially-accessed memory, such as bubble memory.

In one embodiment, the display 156 is an LCD display.

In one embodiment, the processor 150 executes programs that are stored in the memory 154 to control the other devices attached to the bus 158.

In one embodiment, the wireless headset 102 includes a database 160 that may store, for example, a contacts list, emails, photographs, or other information. In one embodiment, the database 160 is a general purpose database accessed using a standard query language, such as Structured Query Language (SQL). In one embodiment, the database 160 has a proprietary format and is accessed using a proprietary query language.

In one embodiment, the wireless headset 102 includes a microphone 162. In one embodiment, the microphone 162 is a standard headset microphone.

In one embodiment, the wireless headset 102 includes an audio circuit 164 that accepts an analog signal from the microphone 162. In one embodiment, the audio circuit converts the analog signal into a digital signal that it makes available to the processor 150 via the busses 158. In one embodiment, the digital signal is a simple digitization of the analog signal from the microphone 162 (e.g, using an analog-to-digital converter and associated circuitry). In one embodiment, the digital signal is compressed. In one embodiment, the analog circuit 164 interprets the analog signal using, for example, voice recognition software. In one embodiment, the analog circuit encodes and/or encrypts the digital signal before making it available to the processor 150 via the bus 158. In one embodiment, the processor 150 assists or entirely performs encoding, encrypting, or other processing. In one embodiment, the processor 150 transmits the resulting signal as a command signal through a network selected as described below.

Similarly, the audio circuit 164 receives digital signals via the busses 158. In one embodiment, the received digital signals can be encoded, encrypted, and/or otherwise processed. In one embodiment, the audio circuit 164 processes the received digital signal and converts it to an analog signal which it provides to a speaker 165. In one embodiment, the speaker 165 is a single speaker. In one embodiment, the speaker 165 includes multiple speakers.

In one embodiment, the wireless headset 102 includes a wireless transmitter/receiver 166 capable of communicating over channels that meet one or more of the IEEE 802.11 family of standards (e.g. 802.11a, 802.11b, 802.11g, 802.11k, 802.11n, 802.11r, etc.), including communicating with WAPs 104a, 104b, and 104c.

In one embodiment, the wireless headset 102 includes a cellular transmitter/receiver 168 capable of communicating over cellular channels, including cellular base station 106.

In one embodiment, the wireless headset 102 includes an "other" transmitter/receiver 170 capable of communicating over another type of communication channel, such as Blue-Tooth.

In one embodiment, each of the WAPs 104a, 104b, and 104c establishes an infrastructure basic service set (BSS), which includes the WAP and any mobile stations, such as wireless laptops with which it is associated, where "associated" means to belong to a network. In one embodiment, from the perspective of the BSS, the wireless headset 102 is a mobile station. In one embodiment, each mobile station, including the wireless headset 102, can be associated with only one BSS. Thus, in this embodiment, at any given time, the wireless headset 102 can only be associated with one of the WAPs 104a, 104b, and 104c. In one embodiment, each BSS has a service set identifier (SSID) that is the name by which the network is known.

In one embodiment, two or more of the BSSs can be joined together to form an extended service set (ESS) by connecting the two or more BSSs to the same backbone network. In one embodiment, the ESS has a single extended SSID. Referring to FIG. 1, a single ESS could be formed, for example, by forming LAN 114a and LAN 114b into the same local area network.

Typically, the coverage areas of BSSs within an ESS are arranged to overlap. In one embodiment, as a station associated with the ESS moves in the coverage area of the ESS the WAPs hand-off the station among each other to maintain the connection of the station with the ESS, using technology that is specified in the IEEE 802.11 specifications.

In some situations a station, such as the wireless headset 102, will wander outside the coverage of the BSS or ESS with which it is associated. This might happen for example, if an ESS is not properly designed so that the coverage of the BSSs that make up the ESS is not continuous or if a WAP forming part of the BSS fails and creates a hole or gap in the ESS coverage. This might also happen if the station simply wanders outside the intended, properly designed, and fully operational coverage area of the BSS or ESS with which it is associated.

In one embodiment, the wireless headset 102 provides a mechanism for transitioning from one BSS/ESS to another. In one embodiment, the wireless headset 102 includes a wireless receiver 172, which, for cost and power consumption reasons, does not include a wireless transmitter. The wireless receiver 172 monitors beacon signals transmitted by the WAPs. In one embodiment, the beacon signals are periodically transmitted by WAPs to allow stations to detect and identify a network. In one embodiment, the period can be set for each WAP. In one embodiment, the beacon signals include a variety of information including whether or not the WAP belongs to an ESS.

In one embodiment, the wireless receiver 172 monitors the wireless environment and detects beacon signals transmitted by WAPs. In one embodiment, the wireless receiver 172 coordinates with a beacon processor 174 and, optionally, the processor 150 to extract the information from the beacon signals and to detect the strength of the beacon signals. In one embodiment, the extracted beacon information and the beacon signal strength is stored in a beacon table 176. In one embodiment, the beacon table 176 contains the most recent snapshot of such information. In one embodiment, the beacon table 176 contains historical versions of such information. In one embodiment, the beacon table 176 contains statistically-analyzed data based on such information. For example, the beacon table 176 may contain moving averages or windowed averages of the extracted beacon information and beacon signal strength.

Figure 2:
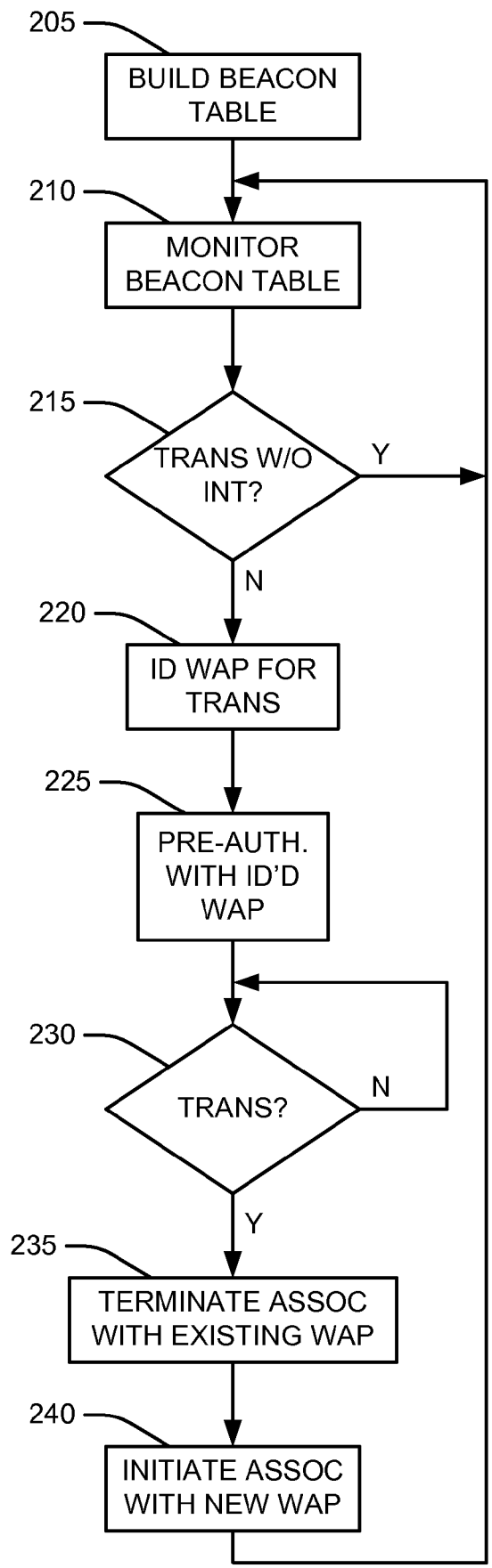
FIG. 2 is a flow chart of a method of managing a call.

In one embodiment, a wireless signal selector 178 working with the processor 150 selects the WAP with which the wireless headset communicates, as shown in FIG. 2. For example, the wireless signal selector 178 may monitor the contents of the beacon table 176 (built as described above (block 205); the beacon table 176 is continuously updated as described above) and notice that the signal strength of the currently-associated WAP is declining and approaching the point in which the connection will be lost (block 210). In one embodiment, the wireless signal selector 178 would then review the beacons in the beacon table 176 to determine if the wireless headset 102 will transition to another WAP in the same ESS without the need for intervention (block 215). If so, in one embodiment, the wireless signal selector 178 will continue to monitor the situation ("Y" branch out of block 215).

On the other hand, in one embodiment, if it appears that the wireless headset 102 will not transition to another WAP without intervention ("N" branch out of block 215), i.e., if the IEEE mechanisms for transitioning from one WAP to another will not result in a transition, the wireless signal selector 178 will identify the most desirable WAP for transition (block 220). In one embodiment, determination of the most desirable WAP will include a consideration of which WAPs listed in the beacon table 176 belong to an ESS with the broadest coverage discernable from the beacon table 176. In one embodiment, this analysis would include a consideration of the WAP signal strength information stored in the beacon table 176. In one embodiment, this analysis would include a consideration of the position and trajectory of the wireless headset 102 determined from location software discussed later in this specification. In one embodiment, the wireless signal selector 178 would select a WAP belonging to an ESS that it appears would cover the wireless headset 102 for the longest period of time. In one embodiment, this determination is done entirely by the wireless network selector 178. In one embodiment, this determination is done by the wireless network selector 178 in conjunction with the processor 150. In one embodiment, this determination is done in conjunction with software running on hardware connected to the network backbone or remotely over a larger network, such as the Internet 116. In one embodiment, this determination is based solely on information in the beacon table 176. In one embodiment, this determination is based on a larger set of information, such as a table that indicates the coverage of WAPs in the vicinity that has been measured by other wireless stations or by other devices.

In one embodiment, if it is decided that a transition from one WAP to another is to occur, the wireless signal selector 178 initiates an IEEE 802.11 pre-authentication procedure with the new WAP (block 225). In one embodiment, when the wireless signal selector 178 decides that the time is right (block 230), such as, for example, when the signal strength of the existing WAP falls below a threshold, the wireless signal selector 178 terminates the wireless headset's association with the existing WAP (block 235) and initiates an association with the new WAP (block 240) and then returns to block 205 to monitor the beacon table.

Returning to FIG. 1, a network selector 180 monitors the wireless network selector 178 and the availability of other communications channels including cellular channels through the cellular receiver/transmitter 168 and "other" communications channels, such as BlueTooth, through the "other" receiver/transmitter 170. For example, in one embodiment, the network selector 180 monitors the cellular network signal strength. In one embodiment, the network selector 180 monitors the feature set, such as caller ID, available over each of the networks available for selection. In one embodiment the network selector 180 selects the network over which the wireless headset 102 will communicate and handles the transitions from one type of network to another.

Thus, in one embodiment, the wireless headset can move to any location where coverage is provided by one of the WiFi networks, the cellular network, or the "other" network without interrupting a call.

Referring again to FIG. 1, a connector labeled "A" indicates a connection to LAN 114a. In one embodiment, illustrated in FIG. 3, LAN 114a is connected to an enterprise's servers 305 and computers 310. In addition, the LAN is connected to one or more PBX systems 315 which allows access to the telephone system 320 (i.e., the Public Switched Telephone Network (PSTN)). The connection to the LAN may be hard wired or it may be a wireless connection.

Figure 4:
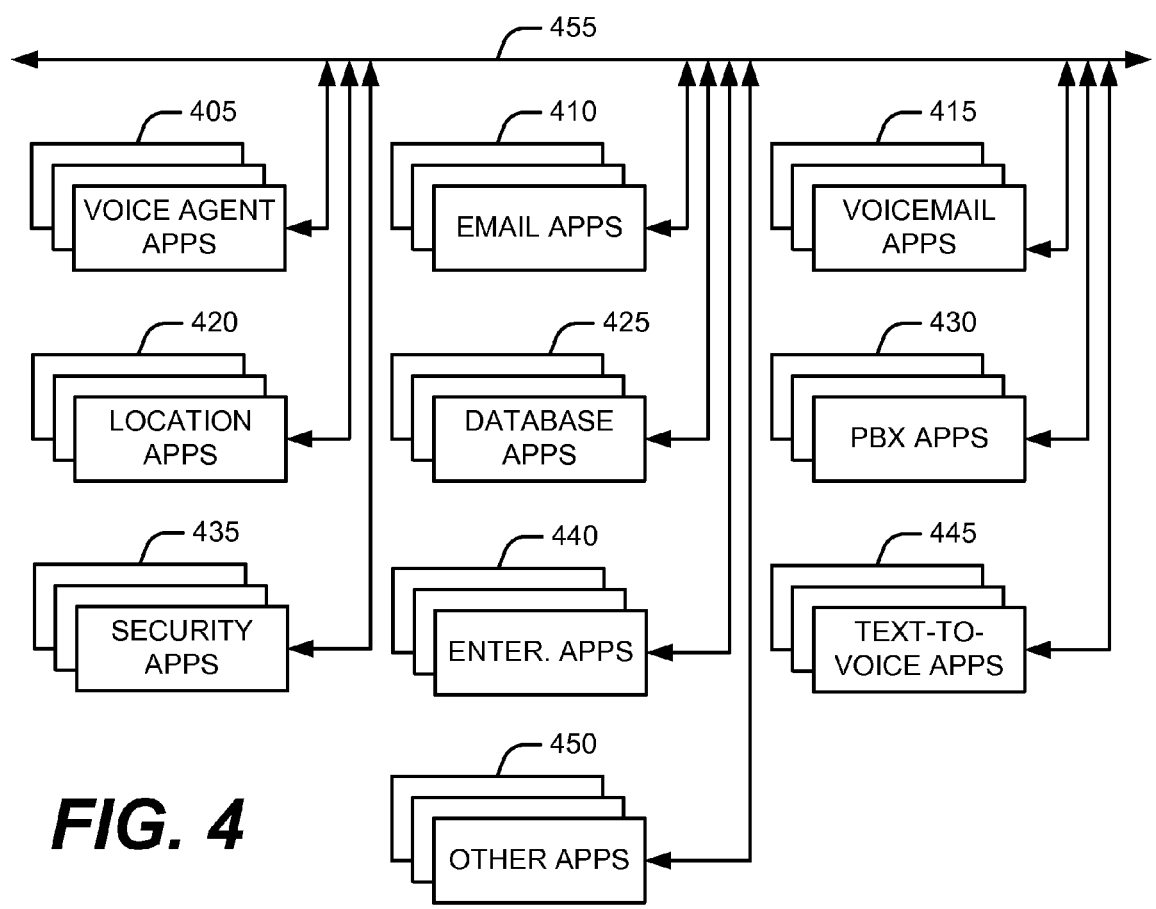
FIG. 4 is a block diagram of software elements of a system.

A number of applications, illustrated in FIG. 4, run on the enterprise servers 305 and computers 310. They include one or more voice agent applications 405, one or more email applications 410, one or more voice mail applications 415, one or more location applications 420, one or more database applications 425, one or more PBX applications 430, one or more security applications 435, one or more entertainment applications 440 (e.g., MP3 players, audio book players, games, and the like), one or more text-to-voice applications, and one or more other applications 450. Some or all of the applications communicate with each other via a signaling system represented on FIG. 3 by a set of lines 455.

In one embodiment, the voice agent applications 405 accept command signals from the wireless headset 102, and in particular the processor 150 in the wireless headset. The voice agent applications 405 include a receiver to receive the command signal from the wireless headset 102. The receiver receives the command signal transmitted over the network selected by the wireless headset 102. In one embodiment, the command signal traverses one or more LANs, one or more telephone systems, the Internet, and other communications systems before it arrives at the voice agent applications 405.

In one embodiment, the command signals include: 1) Personalized Welcome, 2) Secure Authentication, 3) Put Agent in Standby Mode/Recall Agent, 4) Availability and Accessibility Set by User, 5) Communications Filtering Based on User's Presence, Availability, Accessibility and Direct Response, 6) Interruptible/non-interruptible Notifications, 7) Query by Name, Assignment, Function, and Membership for Presence, Availability, Location, and Nearest Neighbor, 8) Call by Name, Assignment, Location, and Number, 9) N-way Calling, 10) Instant Conferencing, Meet-me Conferencing, 11) Paging/Urgent Messaging, 12) Voice Messaging, 13) Callback Requests, 14) Integration with Voice Mail, and 15) Personal Contact List, Exception List. Table 1 below shows a sample dialog or description for some of these features (WiVA (Workspace Intelligent Voice Agent) is the persona for one of the voice agents).

TABLE 1

| Feature | Sample Dialog or Description |
| --- | --- |
| Personalized Welcome and User Authentication | "Jim Smith, welcome to your WiVA. We need to authenticate." |
| Put Agent in Standby/Recall Agent | "WiVA take a break" "WiVA come back" |
| Availability and Accessibility Set by User | "Set my availability to busy" "Set my access level for system users to high" |
| Communications and Notification Filtering Based on User's Presence, Availability, Accessibility, and Direct Response | Contact with users who are not present or who are unavailable to the contactor based on their availability and accessibility settings are blocked. For contacts that are not blocked, the user receives a "whisper notification", and for incoming calls, the option to accept or reject the call. |
| Query by Name, Assignment, Function, and Membership for Presence, Availability, Location, and Nearest Neighbor | "List every research scientist here" "Is Sara Smith available" "List every member of the red team near me" "Is Sara Smith near the staff lounge" "Locate Sara Smith" |
| Call by Name, Assignment, Location, and Number | "Call Sara Smith" "Call my husband" "Call the pharmacy" "Dial a number" |
| N-way Calling | "Call Sara Smith" "WiVA, put this line on hold" "Call Vicki Brown" "WiVA, put this line on hold" "Join all lines" |
| Paging | "Page my doctor" |
| Voice Messaging | "Send a message to Jane Doe" |

For example, in one embodiment, if the command signal "Call Sara Smith" is received, the voice agent applications 405 may transmit a query to one of the database applications 425, one of which may be a contact management system, requesting Sara Smith's telephone number. In one embodiment, if Sara Smith is an employee, the voice agent applications 405 may query a database application 425 that keeps track of which employees are currently in the office and use the resulting information to decide whether to route the call to Sara Smith's office. In one embodiment, if Sara Smith is not in the office, the voice agent applications 405 may access another database application 425 that stores Sara Smith's out-of-office phone call preferences. She may, for example, prefer that phone calls be routed to her cellular telephone during the day and to her home telephone at night.

In one embodiment, the voice agent applications 405 may then determine the status of the party using the wireless headset by accessing another database application 425. In one embodiment, if the caller is in "business mode" the outgoing call is routed through one of the PBX systems 315. In one embodiment, if the caller is in "personal mode" the outgoing call is routed through the Internet 116 to a voice-over-IP system which completes the call.

In one embodiment, the voice agent applications 405 are developed on top of one or more speech servers. In one embodiment, the voice agent applications 405 use the Avaya UCC Speech Server as the platform. In one embodiment, programming the voice agent is done using a VUI designer in combination with VBScript for extended functionality. In an alternative embodiment, the voice agent applications 405 are developed using Voice Browser based platforms, which have the advantage of being available from multiple vendors. Such applications allow the automatic speech recognition (ASR) and text-to-speech (TTS) to be decoupled from the business logic used to implement the voice agent applications. For example, there is a feature in the headset phone where an external process can send an asynchronous whisper notification to a user when an event occurs.

In one embodiment, the UCC Speech Server acts in conjunction with a PC telephony card in a server. Thus, for standard calling, a user simply makes the voice command, "Call Jane" for example, the server accesses that user's database of contacts, determines who Jane is, confirms if there is more than one, and places the call. If the user is in "business mode", that is, making calls on behalf of his/her business, then the call is further run through a virtual PBX for handling calls to and from the headsets. In addition, calls to and from the telephone system 320 are also handled by the telephony card and PBX. In an alternative embodiment, the Voice Browser operates in conjunction with Call Management subsystems and Media Gateways to implement the "business mode" functionality. This allows the headsets to appear as extensions off the PBX when in business mode—a desirable feature if users frequently make/receive external calls—and from their personal phone number when they are in personal mode.

In one embodiment, one or more text-to-voice applications 445 are coupled to, e.g., text-based applications such as the email applications 410 or the database applications 425. In one embodiment, responses from such text-based applications, such as the text of an email, are routed to the text-to-voice applications 445. In one embodiment, the text-to-voice applications 445 convert the text to an audio response which is routed back through the selected network to the wireless headset 102 and to the audio circuit 164. In one embodiment, the audio circuit 164 converts the audio response to an analog signal. In one embodiment, the audio circuit plays the analog signal through the speaker 165 producing an audible response.

In one embodiment, the location applications 420 use Receiver Signal Strength Indicator (RSSI) data to determine the location of the wireless headset 102. An example of such a package is the Norwood Systems' Enterprise Mobility (EM) platform or similar packages for cellular telephones. Applicants tested such a system with Wi-Fi networks and were able to calculate locations to within 5 meters or less. In one embodiment, an auxiliary process (Location Server) converts the (x, y) values into named locations that are familiar to the users (such as "Conference Room A"). In one embodiment, other processes track the movement and trajectory of a user so that estimates of future positions of the user can be provided.

In one embodiment, information about users is stored in a dynamic data store on one of the database applications 440. In one implementation, the dynamic data store is implemented using a standard LDAP database that is front-ended by a Tomcat JSP server, which allows information about a user to be set or accessed through a HTTP query to a known URL. In one embodiment, the dynamic data store, which is referred to as the "Users Panorama," stores all the information by, for and about users such as presence, location, availability, accessibility, roles, groups, areas of expertise, organization rules and policies, as well as individual users' preferences. In one embodiment, user provisioning and system administration is done through a standard web browser using well known URLs to the JSP server.

In one embodiment, when there is a need for data, as long as the system has access to the user's data, a data to voice translator is used to present the data. For example, if an email comes in and the user wants the email read to him/her, the contents of the email are run through the translator. In one embodiment, if immediate response is required, then the system can establish a voice connection with the originator of the email. In one embodiment, if a report or records are needed, they can be sent to a convenient location for viewing, such as a PDA, laptop or other device. Since the data can be forwarded on demand, the device need not belong to the user.

The need for security and authentication is critical in many domains. In one embodiment, security in the headset phone exists at several levels: 1) audio encryption is provided by the network technology, 2) each wireless headset has an unique address that can be mapped to a user, 3) users have to authenticate at login using the SPIN (Spoken PIN) method, and 4) an intrusion detection process monitors the frequency of user activity and prevents lost or stolen headsets being used by unauthorized users provides the fourth level of security.

Having described methods, apparatuses and articles of manufacture for extracting value from a large portfolio of assets, it is believed that other modifications, variations and changes will be suggested to those skilled in the art in view of the teachings set forth herein. It is therefore to be understood that all such variations, modifications and changes are believed to fall within the scope of the present invention. Although specific terms are employed herein, they are used in their ordinary and accustomed manner only, unless expressly defined differently herein, and not for purposes of limitation.

The invention claimed is:

1. A system comprising:
 a wireless headset, comprising:
  an audio circuit adapted to convert a spoken command into a command signal;
  a network receiver adapted to receive beacon signals from wireless access points and not to otherwise communicate with the wireless access points, wherein the network receiver is further adapted to extract data from the received beacon signals;

a processor adapted to create a beacon table, wherein the beacon table contains data extracted from the received beacon signals;

a wireless network selector adapted to select a wireless access point based on a table that indicates a coverage of access points in the vicinity that has been measured by another wireless headset;

wherein the selected wireless access point includes a plurality of wireless access points, wherein each of the plurality of wireless access points are each in a basic service set, wherein each of the basic service sets are grouped into an extended service set that has a single service set identifier, and wherein selecting the wireless access point further comprises selecting an access point that belongs to the extended service set with the broadest coverage discernible from the beacon table;

a wireless network transceiver adapted to communicate with the selected wireless access point, the wireless network transceiver being a separate piece of hardware from the network receiver;

a server in communication with the wireless headset, the server adapted to execute a voice agent application;

a special-purpose application coupled to the voice agent application;

the voice agent application comprising:
  a receiver adapted to receive the command signal from the wireless headset through the selected wireless access point;
  logic adapted to determine that responding to the command signal requires sending a command to the special-purpose application;
  a transmitter adapted to transmit the command to the special-purpose application; and
  a location application to determine a trajectory of the wireless headset, the location application providing the trajectory to the wireless network selector to be used in selecting the wireless access point.

2. The system of claim 1 wherein the wireless headset is coupled to the voice agent application through the selected wireless access point.

3. The system of claim 1 further comprising:
a network selector to select between a network accessed by the selected wireless access point and a second network; and
the wireless headset being coupled to the voice agent through the network selected by the network selector.

4. The system of claim 3 wherein the second network is selected from the group consisting of a cellular network and a BlueTooth network.

5. The system of claim 1 further comprising:
the location application to determine a location of the wireless headset;
the location application providing the location to the wireless network selector to be used in selecting the wireless access point.

6. The system of claim 1 wherein:
the special-purpose application is configured to produce a response upon processing the command; and
the system further comprises:
  a text-to-voice application to:
    receive the response;
    convert the response into an audio signal; and
    transmit the audio signal to the wireless headset; and
  the audio circuit further to convert the audio signal to an audible response.

7. The system of claim 6 wherein the special-purpose application is selected from a group consisting of an email application and a database application.

8. The system of claim 1 wherein the special-purpose application is selected from a group consisting of a voice-mail application, an email application, a database application, an entertainment application, and a PBX application.

9. A system comprising:
a wireless headset, comprising:
  an audio circuit adapted to convert a spoken command into a command signal; a network receiver adapted to receive beacon signals from wireless access points and not to otherwise communicate with the wireless access points, wherein the network receiver is further adapted to extract data from the received beacon signals;
  a processor adapted to create a beacon table, wherein the beacon table is adapted to contain data extracted from the received beacon signals;
  a wireless network selector adapted to select a wireless access point based on a table that indicates a coverage of access points in the vicinity that has been measured by another wireless headset;
  wherein the selected wireless access point includes a plurality of wireless access points, wherein each of the plurality of wireless access points are each in a basic service set, wherein each of the basic service sets are grouped into an extended service set that has a single service set identifier, and wherein selecting the wireless access point further comprises selecting an access point that belongs to the extended service set with the broadest coverage discernible from the beacon table;
  a wireless network transceiver adapted to transmit and receive with the selected wireless access point, the wireless network transceiver being a separate piece of hardware than the network receiver;
a special-purpose application coupled to the wireless headset, the special-purpose application comprising:
  a receiver adapted to receive the command signal from the wireless headset through the selected wireless access point;
  logic adapted to determine that responding to the command signal requires performing a function of the special-purpose application;
  logic adapted to perform the function; and
  a location application to determine a trajectory of the wireless headset, the location application providing the trajectory to the wireless network selector to be used in selecting the wireless access point.

10. The system of claim 9 wherein the special-purpose application is coupled to the wireless headset through the selected wireless access point.

11. The system of claim 9 further comprising:
a network selector to select between the selected wireless access point and a second network,
the wireless headset being coupled to the voice agent through the network selected by the network selector.

12. The system of claim 11 wherein the second network is selected from the group consisting of a cellular network and a BlueTooth network.

13. The system of claim 9 further comprising:
the location application to determine a location of the wireless headset;
the location application providing the location to the wireless network selector to be used in selecting the wireless access point.

14. The system of claim 9 wherein:
the special-purpose application is configured to produce a response upon processing the command; and
the system further comprises:
a text-to-voice application to:
receive the response,
convert it to an audio signal; and
transmit the audio signal to the wireless headset; and
the audio circuit to convert the audio signal to an audible response.

15. The system of claim 14 wherein the special-purpose application is selected from a group consisting of an email application and a database application.

16. The system of claim 9 wherein the special-purpose application is selected from a group consisting of a voice-mail application, an email application, a database application, an entertainment application, and a PBX application.

17. The system of claim 1, wherein the beacon table further comprises a moving average of the data extracted from the beacon signals.

18. The system of claim 1, wherein the beacon table further comprises a windowed average of the data extracted from the beacon signals.

* * * * *